3,309,330
COATED PARTICLES OF VINYLIDENE
CHLORIDE COPOLYMERS
Paul H. Settlage, Richmond, Va., assignor to E. I. du Pont de Nemours and Company, Wilmington, Del., a corporation of Delaware
No Drawing. Filed Dec. 28, 1964, Ser. No. 421,701
5 Claims. (Cl. 260—29.6)

This invention relates to vinylidene chloride coating compositions. More particularly, it relates to improved compositions and films utilizing vinylidene chloride copolymers.

In the development of polyolefin films for a variety of applications it is found that the requirements for many uses are met in a polyolefin film coated with a vinylidene chloride copolymer coating. Such coated films particularly those bearing a coating of high vinylidene chloride content have excellent appearance and especially good barrier properties against penetration of the film by undesired gaseous products or by fats and greases contained in many foodstuffs. A shortcoming of such coated films is that they require a relatively high minimum sealing temperature, which renders the films difficult to seal particularly at high rates of speed when the film is used for high speed automated wrapping of various packaged items.

Use of coatings of lower vinylidene chloride content has been observed to improve the sealing characteristics over a wider temperature range but such coated films have lower solvent resistance and lower greaseproofness than those of higher vinylidene chloride content, the coated products show a definite tendency toward haziness in the areas of the film which have been subjected to flexing adjuvants may be required to prevent undesirable blocking of the coated films.

It is therefore an object of this invention to provide a coating composition which is improved in the properties referred to above. It is a further object to provide coated thermoplastic films having a desired balance of properties such as outlined above.

The present invention resides in the discovery of an aqueous dispersion of polymeric particles, each particle having a core portion and a coating portion on the core portion, the core portion constituting from 60 to 90% by weight of the two portions and comprising essentially a copolymer of the following monomers, where the percentages are by weight based on the total weight of these three monomers:

(A)

| | Percent |
|---|---|
| Vinylidene chloride | 88 to 96 |
| An alkyl acrylate wherein the alkyl group has 1 through 3 carbon atoms and | 2 to 9 |
| Acrylic acid | 1 to 10 | and the coating portion on the core portion constituting from 10 to 40% by weight of the two portions and comprising essentially a copolymer of the following monomers, where the percentages are by weight based on the total weight of these three monomers:

(B)

| | Percent |
|---|---|
| Vinylidene chloride | 60 to 88 |
| Acrylonitrile or an alkyl acrylate or alkyl methacrylate wherein the alkyl group has 1 through 3 carbon atoms and | 11 to 39 |
| Acrylic acid or methacrylic acid | 1 to 10 |

Preferred ranges of the above essential components are as follows:

(A)

| | Percent |
|---|---|
| Vinylidene chloride | 91 to 94 |
| An alkyl acrylate wherein the alkyl group has 1 through 3 carbon atoms and | 4 to 7 |
| Acrylic acid | 2 to 5 |

(B)

| | Percent |
|---|---|
| Vinylidene chloride | 75 to 85 |
| Acrylonitrile or an alkyl acrylate or alkyl methacrylate wherein the alkyl group has 1 through 3 carbon atoms and | 12 to 20 |
| Acrylic acid or methacrylic acid | 3 to 6 |

The polymeric particles can be prepared by techniques known in the art. For example, the monomeric components of formulation (A) above can be subjected to emulsion polymerization to form an aqueous dispersion of copolymer (A), followed by mixing with this dispersion the monomeric components of formulation (B) above, and subjecting the resulting mass to further polymerization conditions, to obtain the core-and-coating particles described above.

In a typical procedure, the monomeric components of formulation (A) above are mixed in an aqueous phase containing a water-soluble polymerization catalyst, such as potassium persulfate, and a surface active agent capable of emulsifying the monomeric materials in water. Examples of suitable emulsifiers are the soluble salts of long chain alkyl sulfates or sulfonates, petroleum hydrocarbon sulfonates, and the like. The polymerization is usually carried out by heating the aqueous emulsion at temperatures of about 40° to 60° C. with agitation. Following that polymerization, the monomeric components of formulation (B) above are added and copolymerized onto the copolymer particles of (A). The resulting dispersion of the copolymeric two-stratum particles can be filtered and stabilized by addition of further surface active agent in the usual manner.

Also in accordance with known techniques, one or more conventional additives can be admixed with the dispersion prior to use. For example, plasticizers, pigments, thickeners, stabilizers, pH adjusting agents such as ammonium hydroxide, etc., can be readily incorporated in the dispersion by any suitable mixing means such as a colloid mill, homogenizing device or similar apparatus. Additionally, small amounts of polymerizable monomers other than those specifically recited above can be tolerated as long as the outstanding properties of the compositions are not destroyed. Such monomers include acrylonitrile, methacrylonitrile, methyl methacrylate, methacrylic acid, and the like.

The polymeric particle compositions of this invention will ordinarily for most end uses have an average particle size in the range from 0.01–0.2 micron although smaller or larger particles can be suitably made and used. Most particles prepared as described herein will fall in the range of 0.05–0.08 micron.

The compositions of this invention can usefully be applied as a coating onto plastic films by any known coating technique. For coating, the compositions will preferably have a concentration of from about 30 to 50% by weight solids. In a preferred coating method, the dispersions are applied to the film by passing the film through one or more baths in a batch or continuous manner. Coatings can also be sprayed onto the film or applied manually by brushing or the like. The thickness of the coatings can be adjusted in accordance with known methods and can be any desired thickness depending on the particular use and the nature of the effect desired. Ordinarily, coatings of from about 0.5 to 20 grams per square meter will be satisfactory with preferred advantages being obtained in the range from about 2 to 12 grams per square meter.

A preferred coated article is obtained when the compositions of this invention are coated on a biaxially oriented dimensionally stable polypropylene film. The preparation of an excellent biaxially oriented polypropylene film is described in Goldman and Wallenfels United States Patent No. 3,141,912 issued July 21, 1964. An excellent method for dimensionally stabilizing such films is described in Belgian Patent No. 638,742. Other plastic films can advantageously utilize coatings of this invention. Among such films can be mentioned other polyolefin films such as ascast polypropylene films and polyethylene films both biaxially oriented and ascast. The coatings of this invention can also be used on other films such as polyethylene terephthalate, polyvinyl chloride and polyvinyl fluoride films. If desired, prior to application of the coating, the plastic film can be treated by known techniques to improve adhesion of the coating. A preferred treatment is the flame treatment described in Belgian Patent No. 637,744.

As mentioned above, the alkyl acrylate component of (A) and (B) is a lower alkyl acrylate including methyl acrylate, ethyl acrylate, n-propyl acrylate and/or isopropyl acrylate. Similarly, the alkyl methacrylate when used as a component of (B) is a lower alkyl methacrylate including methyl methacrylate, ethyl methacrylate, n-propyl methacrylate and/or isopropyl methacrylate.

The following examples are given for purposes of illustration only and should not be construed to limit the invention in any way. Parts and percentages are by weight unless otherwise indicated.

*Example 1*

A typical vinylidene chloride copolymer is prepared as follows. In a reator fitted with stirrer and condenser and flushed with nitrogen there is placed at room temperature the following:

| | Pounds |
|---|---|
| Water | 113.2 |
| Sodium lauryl sulfate in aqueous solution, 33% active ingredient ("Duponol" WAQ sodium lauryl sulfate, registered trademark of E. I. du Pont de Nemours & Company) | 4.3 |
| Acrylic acid | 1.9 |
| Methyl acrylate | 7.0 |
| Vinylidene chloride | 86.5 |

This provides a mixture containing vinylidene chloride, methyl acrylate and acrylic acid in a weight ratio of approximately 91 to 7 to 2, respectively.

The weigh tank is flushed with 10.0 pounds of water which is added to the ingredients listed above, after which heating of the reaction mixture is started. When the temperature of the mixture reaches about 29° C., 16.5 grams of ammonium persulfate dissolved in 2.5 pounds of water is added. At a temperature of 30–31° C., 33.0 grams of sodium meta-bisulfite and 0.35 gram of ferrous ammonium sulfonate dissolved in 2.5 pounds of water are added. Thereafter the loading ports of the reactor are flushed with 5.0 pounds of water and heating is continued.

The condenser of the reactor is left open to the atmosphere for 30 to 45 minutes as the reaction mixture begins to reflux at about 35° C. It is then closed as the exothermic reaction proceeds during which a pressure of about 5 pounds per square inch gauge develops. When the reaction mixture stops refluxing it is cooled to about 35° C. and there is then introduced into the reactor 13.0 pounds of vinylidene chloride, 3.2 pounds of methyl acrylate and 0.64 pound of acrylic acid (77 to 19 to 4 ratio). The reaction mixture again proceeds to reflux (in some cases gentle heating is required to start the reaction) and the reactor is closed again while the exothermic reaction proceeds. When the reaction mixture stops refluxing, indicating completion of polymerization of the second portion of reactants, nitrogen is introduced through the condenser to a pressure of 5–10 pounds per square inch gauge until the mixture begins to cool. The core portion and shell or coating portion of the product particles are in an 85/15 weight ratio.

There is then added to the reactor an additional 2.8 pounds of "Duponol" WAQ mixed with 4.0 pounds of water. The reaction mixture is filtered after which Carnauba Wax dispersed as a 10% emulsion with a mixture in water of 2.3% sorbitan monooleate polyoxyethylene ("Span" 60, registered trademark of Atlas Powder Co.) and 5.2% sorbitan monooleate ("Tween" 60, registered trademark of Atlas Powder Co.), is added to the mixture to give 2.0% wax solids based on the total weight of copolymer solids.

Following this a one mil thick biaxially oriented polypropylene film, treated for adherability by subjecting its surface to a substantially neutral flame as the film is passed over a drum maintained at 70° C. following the procedure of Kritchever United States Patent No. 2,648,097 issued Aug. 11, 1953, is passed at 50 feet per minute through a coating bath of an aqueous dispersion of the vinylidene chloride copolymer prepared as described above. Excess dispersion is doctored from the film surface and the coated film is dried by passing through a coating tower held at a temperature in the range of 80–95° C. The dried film bearing about 8 grams of coating per square meter of film is wound into mill rolls.

The coated films were submitted to a heat seal test shows the heat seal strength in the range of 150–400 grams per inch when sealed at a heat sealing range of 100–140° C. As a control film, a similar polypropylene film made and treated as described above and coated with a vinylidene chloride copolymer comprising approximately 91% by weight of vinylidene chloride, 7% by weight of methyl acrylate, and 2% by weight of acrylic acid showed essentially no heat seal strength when attempts were made to seal it at temperatures below 130° C.

To determine the improvement in the film of this invention with respect to the tendency toward flex crazing the test film was placed in a stress flex tester (H. C. Horst and R. E. Martin—Modern Packaging, March 1961, page 123) and flexed for 50 cycles. The section of film submitted to the flexing was then placed in a Gardener Haze Meter and a reading of the amount of haze was made and expressed as increase in the amount of haze of the coated film with respect to that of the uncoated base film. The coated film under the test showed a haze increase of 4%. The control film illustrated above with the coating of approximately 91% of vinylidene chloride, 7% of methyl acrylate and 2% of acrylic acid showed a haze increase of only 2% but as indicated above it showed poorer heat sealability than did the test film. In still another control a similar polypropylene film coated with a vinylidene chloride copolymer comprising 77% by weight of vinylidene chloride, 19% by weight of methacrylate and 4% by weight of acrylic acid, which normally shows a broader heat sealing range, when submitted to the flex crazing test showed a haze increase of 10%. The advantage of the test coated film over the control films in respect to flex crazing as well as good sealing characteristics is thus clearly apparent.

*Example 2*

Following the procedure of Example 1, another 85/15 weight ratio particle dispersion was prepared, using the same ingredients in the same proportions as in that example, and compared with a physical mixture of the two copolymers in the same overall weight ratio of 85/15. The results of coating these two dispersions onto biaxially oriented polypropylene film and thereafter submitting the test films to heat seal tests over a range of temperatures is shown below. The two-stage product of the present invention was coated to a thickness of 4.0 grams of polymer per square meter of film surface. The coating thickness of the physical mixture was 4.2 grams per square meter. The heat seals were carried out for ¼ second and 5 p.s.i. along a 1-inch line at the indicated temperature. The heat-sealed samples were held at room temperature and 35% relative humidity for 24 hours and the force required to pull the seal apart was measured in grams per inch.

|  | Sealing temperature (° C.) | | | | | |
|---|---|---|---|---|---|---|
|  | 90 | 100 | 110 | 120 | 130 | 140 |
| This invention | 0 | 15 | 295 | 280 | 305 | 350 |
| Physical mixture | 0 | 0 | 45 | 115 | 100 | 155 |

Different samples of each type which had been heat-sealed at 130° C. as described were held at room temperature and 81% relative humidity following heat-sealing for 24 hours, after which tests showed a heat-seal strength of 105 grams per inch for the sample of this invention and 45 grams per inch for the physical mixture sample.

*Example 3*

To apply coating compositions of this invention to other films, the procedures of Example 1 can be followed using in place of the polypropylene film such films as, for example, polyethylene terephthalate, polyethylene, polyvinyl chloride, polyvinyl fluoride, and the like.

The foregoing examples can be repeated, as will be readily understood by persons skilled in this art, by substituting other materials within the indicated scope of this invention for those of the specific exemplifications.

It is to be understood that the foregoing detailed description is given merely by way of illustration and that many variations may be made therein without departing from the spirit or scope of this invention.

The invention claimed is:

1. A composition comprising an aqueous dispersion of polymeric particles, each particle having a core portion and a coating portion on the core portion, the core portion constituting from 60 to 90% by weight of the two portions and comprising essentially a copolymer of the following monomers, where the percentages are by weight based on the total weight of these three monomers:

(A)

| | Percent |
|---|---|
| Vinylidene chloride | 88 to 96 |
| An alkyl acrylate wherein the alkyl group has 1 through 3 carbon atoms | 2 to 9 |
| and | |
| Acrylic acid | 1 to 10 | and the coating portion on the core portion constituting from 10 to 40% by weight of the two portions and comprising essentially a copolymer of the following monomers, where the percentages are by weight based on the total weight of these three monomers:

(B)

| | Percent |
|---|---|
| Vinylidene chloride | 60 to 88 |
| A compound selected from the group consisting of acrylonitrile, an alkyl methacrylate wherein the alkyl group has 1 through 3 carbon atoms | 11 to 39 |
| and | |
| A compound selected from the group consisting of acrylic acid and methacrylic acid | 1 to 10 |

2. A composition comprising an aqueous dispersion of polymeric particles, each particle having a core portion and a coating portion on the core portion, the core portion constituting from 60 to 90% by weight of the two portions and comprising essentially a copolymer of the following monomers, where the percentages are by weight based on the total weight of these three monomers:

(A)

| | Percent |
|---|---|
| Vinylidene chloride | 91 to 94 |
| An alkyl acrylate wherein the alkyl group has 1 through 3 carbon atoms | 4 to 7 |
| and | |
| Acrylic acid | 2 to 5 | and the coating portion on the core portion constituting from 10 to 40% by weight of the two portions and comprising essentially a copolymer of the following monomers, where the percentages are by weight based on the total weight of these three monomers:

(B)

| | Percent |
|---|---|
| Vinylidene chloride | 75 to 85 |
| A compound selected from the group consisting of acrylonitrile, an alkyl acrylate and an alkyl methacrylate wherein the alkyl group has 1 through 3 carbons | 12 to 20 |
| and | |
| A compound selected from the group consisting of acrylic acid and methacrylic acid | 3 to 6 |

3. An article comprising a coating of a composition of claim 1 on a plastic film.

4. An article comprising a coating of a composition of claim 1 on a polypropylene film.

5. An article comprising a coating of a composition of claim 1 on a polyethylene tetrephthalate film.

References Cited by the Examiner

UNITED STATES PATENTS

| 2,824,025 | 2/1958 | McIntyre | 117—161 |
| 2,894,927 | 7/1959 | Elder et al. | 260—29.6 |
| 3,041,208 | 6/1962 | Hay et al. | 117—161 |

MURRAY TILLMAN, *Primary Examiner.*

W. J. BRIGGS, Sr., *Assistant Examiner.*